United States Patent [19]

Moseman

[11] Patent Number: 4,769,897

[45] Date of Patent: Sep. 13, 1988

[54] METHOD FOR FORMING A PRESS-FITTED PIPE JOINT

[75] Inventor: Merlin H. Moseman, Omaha, Nebr.

[73] Assignee: Enron Corp., Houston, Tex.

[21] Appl. No.: 526,290

[22] Filed: Aug. 25, 1983

[51] Int. Cl.$^4$ ............................................. B23P 19/02
[52] U.S. Cl. ..................................... 29/525; 285/382; 403/282
[58] Field of Search ................... 29/525, 458; 285/382, 285/382.4, 24, 27; 403/282

[56] References Cited

U.S. PATENT DOCUMENTS

| | | | |
|---|---|---|---|
| 1,781,682 | 11/1930 | Crotty . | |
| 1,824,500 | 9/1931 | Reichenbecher . | |
| 2,741,498 | 4/1956 | Elliott | 29/525 X |
| 3,208,136 | 9/1965 | Joslin | 29/458 |
| 3,210,102 | 10/1965 | Joslin | 285/382.4 X |
| 3,272,539 | 9/1966 | Ashbury, Sr. | 285/382 X |
| 3,466,738 | 9/1969 | Mount | 29/525 |
| 4,302,874 | 12/1981 | Colas | 29/525 X |
| 4,389,134 | 6/1983 | Colas | 285/382.4 X |

FOREIGN PATENT DOCUMENTS

| | | | |
|---|---|---|---|
| 2356463 | 1/1978 | France | 29/525 |
| 435700 | 9/1935 | United Kingdom | 29/525 |

*Primary Examiner*—Charlie T. Moon
*Attorney, Agent, or Firm*—Zarley, McKee, Thomte, Voorhees & Sease

[57] ABSTRACT

An improvement is disclosed in a method for forming a press-fitted pipe joint by flaring the bell end of one pipe section and forcing the unflared pin end of the other pipe section into the bell end until the sections are overlapping for a substantial length. The improvement comprises forming the bell end so that it has a greater wall thickness than the pin end.

1 Claim, 1 Drawing Sheet

METHOD FOR FORMING A PRESS-FITTED PIPE JOINT

BACKGROUND OF THE INVENTION

Pipe joints have in the past been made between pipes in which a bell or socket formed at one end of each pipe section and the opposite end of the adjacent pipe section is inserted in the bell or socket. In order to produce a tight joint, packings of soft metal, asphaltic material or like substances, have been introduced before the pipe sections are forced together. Alternatively, the pipe sections are welded at the joint and thus a tight joint is secured. Another example is found in the joints in tube sections of vacuum cleaners. Here a bell with an internal diameter only slightly larger than the outside diameter of the section to which it is joined is utilized so that a close fitting joint results and the slight friction between the parts is sufficient to make the joint free from accidental separation of the pipe sections. In all such applications carefully controlled tolerances between the mating diameters are maintained.

U.S. Pat. No. 3,466,738 issued to Wadsworth W. Mount on Sept. 16, 1969 discloses a method for joining pipe sections having comparatively thin walls relative to the diameter, which pipe sections may be of exactly equal nominal size and wall thickness and may be forced into overlapping engagement without subjecting either of the pipe sections at the joint to stresses in excess of the rupture limit of the steel of which the pipes are formed. The elasticity of the outer pipe at the joint makes an extremely tight joint without reliance on predetermined tolerances and may require many thousands of pounds of force to press the sections together and thereafter to pull apart. Furthermore, the complete joint retains nearly the same original inside diameter on the inside pipe when two pipes are joined by this method.

It is an object of the present invention to provide a press-fitted pipe joint with significantly improved joint strength relative to the pipe joints which are formed according to the method of the above patent. The object of this invention is achieved by forming the outer or bell end of one of the pipe sections so that it has a greater wall thickness than the inner or pin end of the other pipe section.

SUMMARY OF THE INVENTION

The present invention is an improvement in a method for forming a press-fitted pipe joint by flaring one end (the bell end) of one pipe section and forcing an unflared end (the pin end) of the other pipe section into the flared end until the sections are overlapping for a substantial length. The improvement comprises forming the flared end so that it has a greater wall thickness than the unflared end. In one embodiment of the present invention, a sleeve is placed over the end of the pipe section which is to be flared.

DETAILED DESCRIPTION OF THE INVENTION

During the fabrication of the mechanical pipe joint, the section of pipe forming the outer or bell end is flared outward by the mating section of the pipe designated as the inner or pin end. When pipe sections of the same wall thickness are joined, the bell end undergoes nearly all of the deformation required for the press-fit assembly with the pin end having only a slight diameter reduction. When placed under pressure, this type of joint will normally fail by pulling apart at the mechanical joint when the pressure inside the pipe approaches the ultimate burst pressure of the pipe. In some cases, the pressure at which joint failure occurs is considerably less than the ultimate burst rating of the pipe.

I have found that the strength of the press-fit joint can be significantly increased when the mechanical joint is formed so that the pin end of one of the pipe sections is of normal wall thickness and the bell end of the other pipe section is of a heavier or thicker wall thickness.

In other words, each of the pipe sections has a flared end of greater wall thickness and an unflared end of lesser wall thickness. In the formation of this type of joint, the bell end is not flared significantly but instead the majority of the required deformation results in the thinner wall pin end. A joint formed in this manner will not fail by pulling apart but will instead fail by splitting the thinner pipe wall along its longitudinal access at a point not in proximity of the mechanical joint. Thus, my improved joint is stronger than the pipe itself.

It is significant that a joint formed of dissimilar wall thicknesses wherein the pin end of the pipe is thicker than the bell end of the pipe is no stronger than a joint formed wherein the wall thicknesses are the same. The joint strength improvement in my invention results from having the thinner wall pipe pressed into the heavier wall section. The thicker wall bell end is stronger and thus exerts more inward or pinching force on the thinner pin end to increase the strength of the joint.

Figure 1:
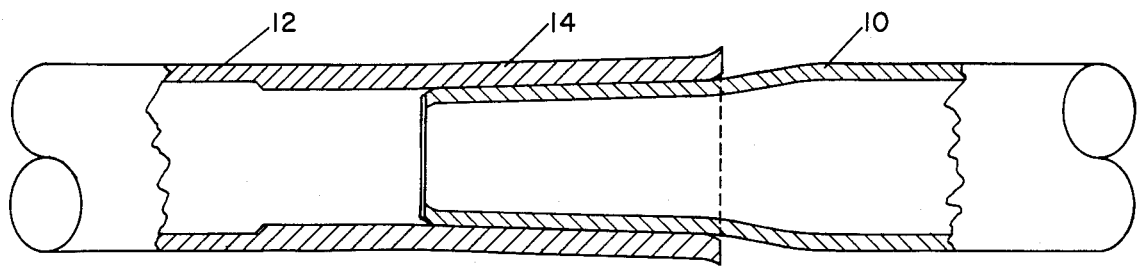
FIG. 1 illustrates the present invention wherein the bell end of one of the pipe sections is shown to be of thicker wall thickness than the pin end of the other pipe section.
Figure 2:
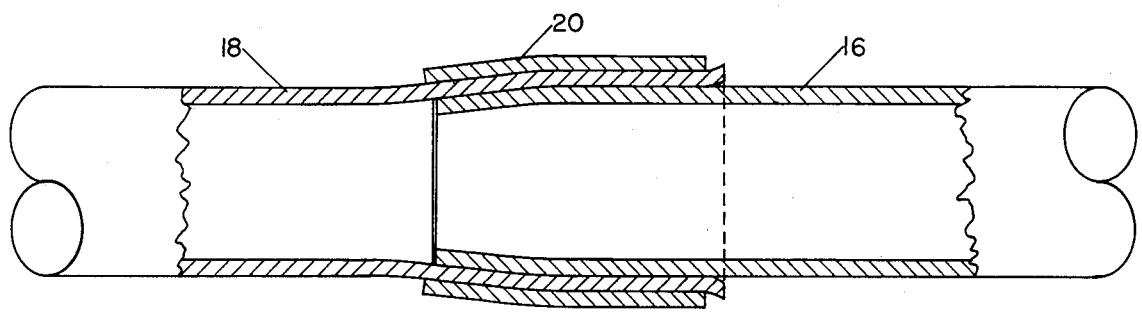
FIG. 2 shows a sleeve which has been placed around the bell end of the outer pipe section to increase its effective thickness.
Figure 3:
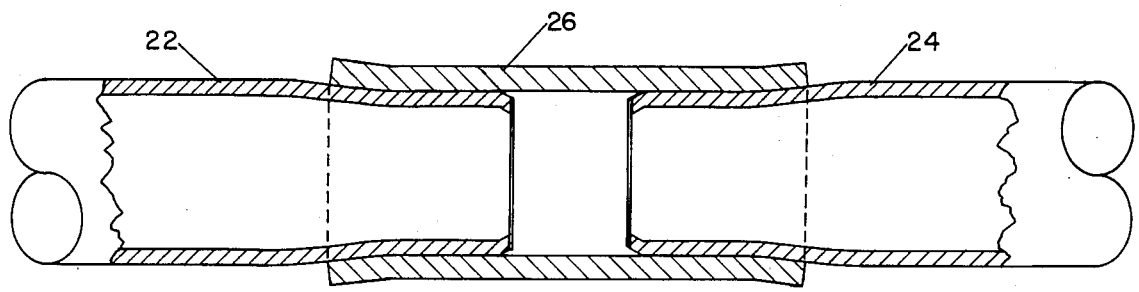
FIG. 3 illustrates an embodiment of the present invention wherein a center section of increased wall thickness is interposed between two sections of thinner wall thickness.

FIG. 1 illustrates one embodiment of the present invention. The pin end of pipe section 10 has been forced within pipe section 12. Pipe section 12 has a bell end 14 which is of greater wall thickness than pipe section 10. In FIG. 2, pipe section 16 has been forced within pipe section 18. The two pipe sections have the same wall thickness but the advantages of the present invention have been achieved by placing a sleeve 20 around the outside of the bell end of pipe section 18. FIG. 3 illustrates another embodiment of the present invention wherein pipe sections 22 and 24 of identical and smaller wall thickness have been forced into opposite ends of pipe section 26 which is of greater wall thickness.

The press-fitted pipe joints of the present invention may be formed by any convienent method. One such method is disclosed in U.S. Pat. No. 3,466,738 discussed above.

I claim:

1. In a method for forming a press-fitted pipe joint by flaring an end of a first pipe section and forcing an unflared end of a second pipe section into the flared end of the first pipe section until the sections are overlapping for a substantial length, the improvement which comprises forming the flared end of the first pipe section so that it has a greater wall thickness than the unflared end of the second pipe section, each of said pipe sections having a flared end of greater wall thickness and an unflared end of lesser wall thickness.

* * * * *